Patented May 18, 1937

2,080,589

UNITED STATES PATENT OFFICE 2,080,589

SEPARATING AFTER-CHLORINATED POLYVINYLCHLORIDE FROM ITS SOLUTIONS

Georg Wick, Bitterfeld, Germany, assignor to I. G. Farbenindustrie Aktiengesellschaft, Frankfort-on-the-Main, Germany No Drawing. Application December 5, 1936, Serial No. 114,335. In Germany August 9, 1935

4 Claims. (Cl. 260—2)

The present invention relates to an improvement in the manufacture of after-chlorinated polyvinylchloride and more particularly to a process for separating the after-chlorinated polyvinyl compound from its solvent.

In U. S. Patent No. 1,982,765 there is described the production of after-chlorinated polyvinylchloride and in Example 1 of this patent there is disclosed the conversion of a low polymeric polyvinylchloride suspended in carbon tetrachloride into a product of higher chlorine content by treatment of the heated suspension with chlorine, the after-chlorinated product dissolving in carbon tetrachloride; on cooling the solution thus formed to ordinary temperature and adding methanol this product is precipitated.

Of more importance for industrial purposes is the production of highly polymeric after-chlorinated polyvinylchloride. This, however, cannot be advantageously made by the above method of isolation since in precipitating the solution with a non-solvent for polyvinylchloride, for instance methanol, there is obtained an even more coarsely flocculent, tough precipitate which can be freed from solvent only with difficulty. As described in Example 2 of the said specification another process of isolation is used in the case of the highly polymeric after-chlorinated polyvinylchloride.

According to my invention all grades of polymerization of the after-chlorinated polyvinylchloride may be produced in uniform, very pure precipitates of the nature of a sandy powder, which is easily filtered and purified by washing. The nature of the invention may be gathered from the following description:

The solution of the after-chlorinated polyvinylchloride, for example in tetrachlorethane, if desired after concentration by evaporation of a part of the solvent so as to obtain a solution of about 10 per cent. strength, is cooled until the solution begins to gel. This, according to the degree of polymerization, requires a cooling to a temperature between about 0° C. and about —40° C. To the cooled gelatinized solution there is added whilst stirring a non-solvent for polyvinylchloride, for instance methanol, in the proportion of about ½ to ⅓ of the volume, the non-solvent being previously cooled; the after-chlorinated polyvinylchloride is thus precipitated practically quantitatively in the form of a sandy white powder characterized by ease of filtration and capable of being washed with methanol until it is of a high degree of purity, since all the impurities introduced by the solvent remain in the latter. This result of the process of precipitation is surprising since one would have been disposed to assume that the gelatinizing viscid solution would be less suitable for the precipitation than a mobile warm solution.

In practice, I prefer to start with a solution of the after-chlorinated polyvinylchloride of a high grade of polymerization in tetrachlorethane since the treatment of highly polymerized vinylchloride preferably is carried out in the presence of this organic solvent. In this particular case gelatinizing of the after-chlorinated product occurs at about —20° to about —30° C. the solution containing about 10 per cent. of after-chlorinated polyvinylchloride.

Instead of methanol there may be used other non-solvents such as, for instance, the lower aliphatic alcohols or aliphatic hydrocarbons, such as petroleum ether, gasolene.

What I claim is:—

1. In the process of separating an after-chlorinated polyvinylchloride from its solutions in organic solvents the steps which comprise cooling the solution to about 0° C. to about —40° C. until it gelatinizes, and adding a non-solvent.

2. In the process of separating an after-chlorinated polyvinylchloride from its solutions in organic solvents the steps which comprise cooling the solution to about 0° C. to about —40° C. until it gelatinizes, and adding cooled methanol.

3. In the process of separating an after-chlorinated polyvinylchloride from its solutions in tetrachlorethane the steps which comprise cooling the solution to about 0° C. to about —40° C. until it gelatinizes, and adding about ½ to about ⅓ of the volume of cooled methanol.

4. In the process of separating an after-chlorinated polyvinylchloride from its solutions in tetrachlorethane the steps which comprise concentrating the solution so that it contains about 10 per cent of the after-chlorinated polyvinylchloride, cooling the solution to about —20° C. to about —30° C. until it gelatinizes and adding about ½ to about ⅓ of the volume of cooled methanol.

GEORG WICK.